United States Patent [19]
Bieker

[11] 4,226,293
[45] Oct. 7, 1980

[54] TRACK-LAYING VEHICLE WITH IMPROVED SUSPENSION

[75] Inventor: Ron D. Bieker, McCook, Nebr.

[73] Assignee: Miller W. Corporation, Stratton, Nebr.

[21] Appl. No.: 21,149

[22] Filed: Mar. 16, 1979

[51] Int. Cl.³ .............................................. B62D 55/06
[52] U.S. Cl. ..................................................... 180/9.5
[58] Field of Search ...................... 180/9.5, 9.52, 9.54, 180/9.56, 9.58, 9.6, 9.2 R; 280/104

[56] References Cited

U.S. PATENT DOCUMENTS

| | | | |
|---|---|---|---|
| 1,746,001 | 2/1930 | Leake | 180/9.54 |
| 2,988,159 | 6/1961 | Weber | 180/9.5 |
| 3,361,221 | 1/1968 | Tyler | 180/9.5 |
| 3,464,512 | 9/1969 | Schaffner | 180/9.54 |
| 4,018,295 | 4/1977 | Hasselbacher | 180/9.5 |
| 4,166,511 | 9/1979 | Stedman | 180/9.5 |

Primary Examiner—Robert R. Song
Attorney, Agent, or Firm—Henderson & Sturm

[57] ABSTRACT

A track-laying vehicle in which the track units, mounted for relative vertical oscillation, are cross-connected by equalizer means including parallel linkage and further include bogie type rolling elements mounted on walking beams.

10 Claims, 11 Drawing Figures

TRACK-LAYING VEHICLE WITH IMPROVED SUSPENSION

SUMMARY OF THE INVENTION

The typical track-laying or crawler vehicle includes a longitudinal main frame carried by and between a pair of fore-and-aft track units mounted to the main frame at their rear ends on a common transverse axis for oscillation in vertical planes and cross-connected at or adjacent to their front ends by transverse equalizer means pivoted to the body at its longitudinal center line to control or guide the track units during such oscillation. Each track unit conventionally comprises an endless track trained about several rolling elements, one of which is driven for propulsion of the vehicle. The equalizer means normally consists of a transverse spring.

Crawlers of this type are generally basic to those adapted for heavy-duty operation, as in bulldozing, construction and other off-road areas, and are usually heavy, quite ponderous and lack mobility and versatility for operation in other conditions. Thus they do not readily lend themselves to such operations as grooming ski slopes and trails where a high degree of flotation is required, along with lighter weight and increased maneuverability and versatility. Snow grooming vehicles, while borrowing somewhat from the conventional crawler, require much wider treads and track widths and suspensions that enable the vehicle to maximize track-to-ground contact despite extreme variations in ground contour, such as side slopes, swales and ridges.

The present invention relates especially to a track-laying vehicle particularly adapted for operation as a snow grooming machine and thus features improved track unit suspension and bogie wheel mounting. More particularly, the track units, arranged as usual for vertical oscillation relative to each other and to the main body, are cross-connected by equalizer means in the form of transversely disposed parallel linkage. Each track unit includes a plurality of rolling elements, here in the form of pneumatically-tired wheels, at least a pair of which is mounted at opposite ends of a fore-and-aft walking beam pivoted intrmediate its ends to the track frame or carriage on a transverse axis so that as one bogie wheel moves downwardly the other moves upwardly in an equal amount. A further feature is that the parallel linkage equalizer means includes guide rollers engageable with the innersides of the upper and lower runs of the opposite tracks of the respective track units during vertical oscillation of those units beyond a predetermined amount. Other features of the invention reside in the coaction of the walking-beam-mounted bogie wheels and the parallel linkage equalizer means to the end that the vehicle overall functions to keep maximum track area on the ground at all times, regardless of variations in ground contour, thus improving flotation, traction and maneuverability. The parallel linkage comprises a pair of cross bars arranged one behind the other in side-by-side relationship to afford a compact structure contributing to the low center of gravity of the vehicle and providing for compactness and ease of assembly and maintenance, all functioning to keep the track units in vertical planes during oscillation thereof.

DETAILED DESCRIPTION

Figure 1:
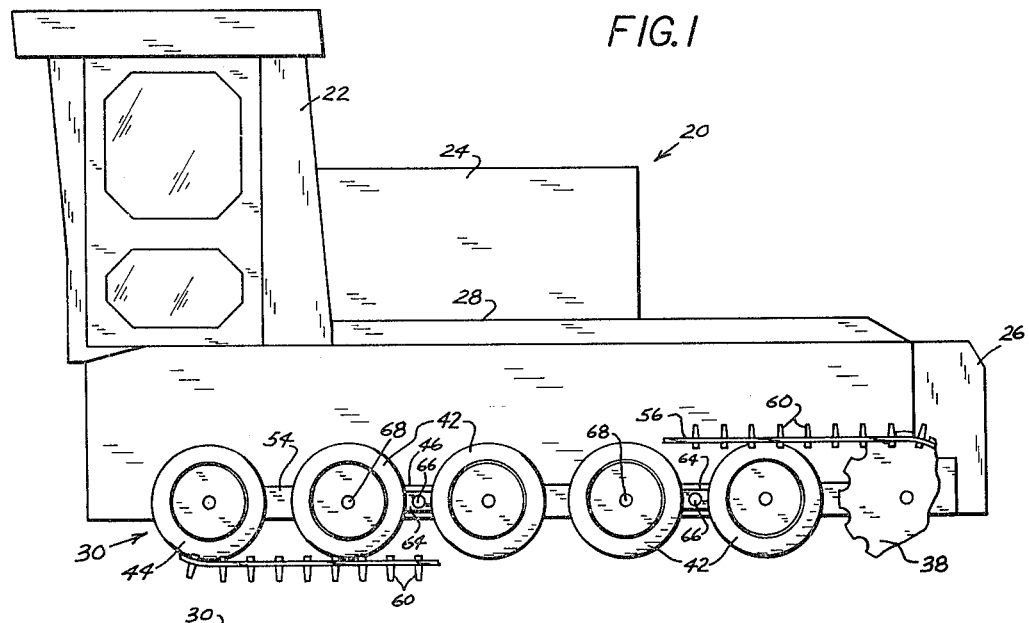
FIG. 1 is a simplified side elevation of a preferred form of vehicle embodying the invention.
Figure 2:
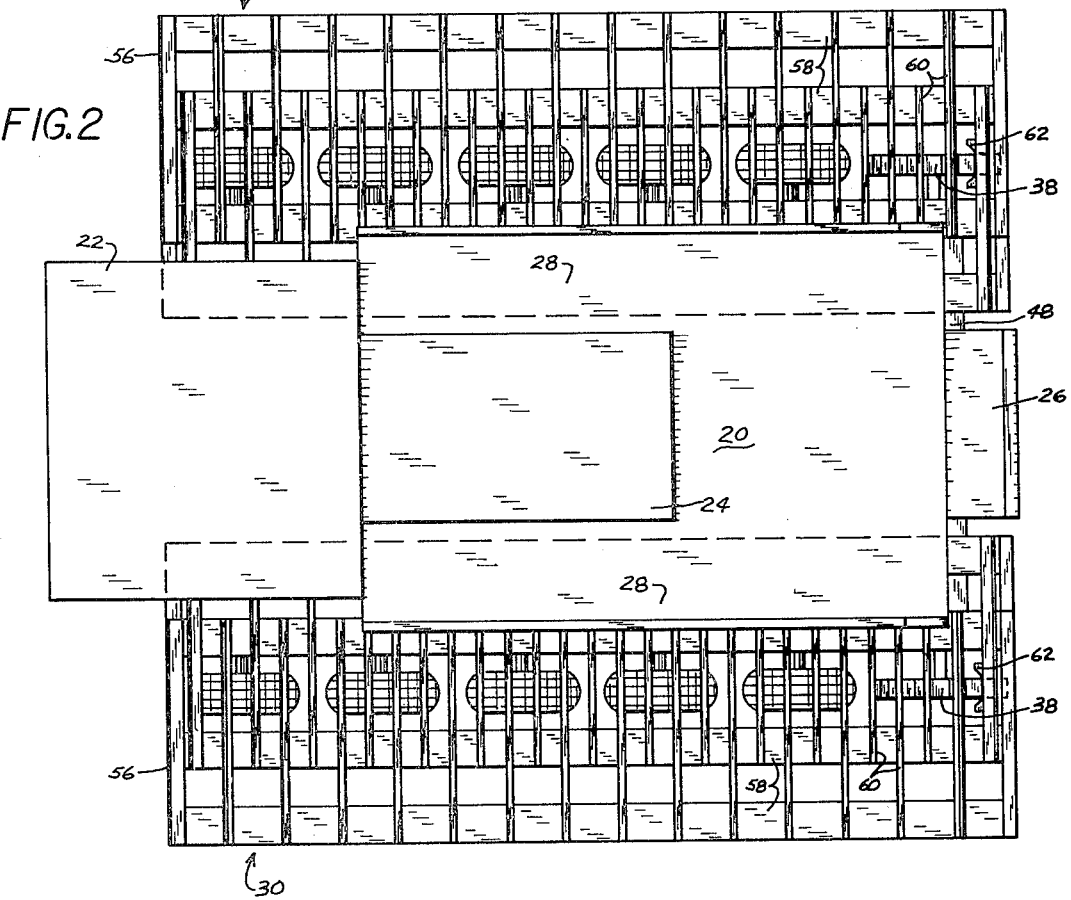
FIG. 2 is a plan view of the same.
Figure 3:
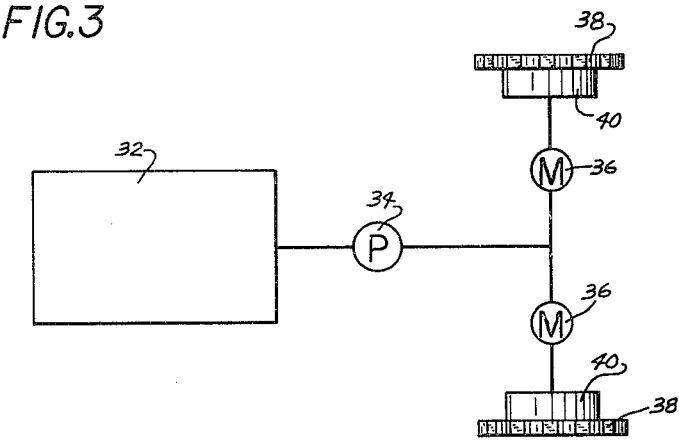
FIG. 3 is a schematic view of one form of drive means for propulsion of the vehicle.
Figure 4:
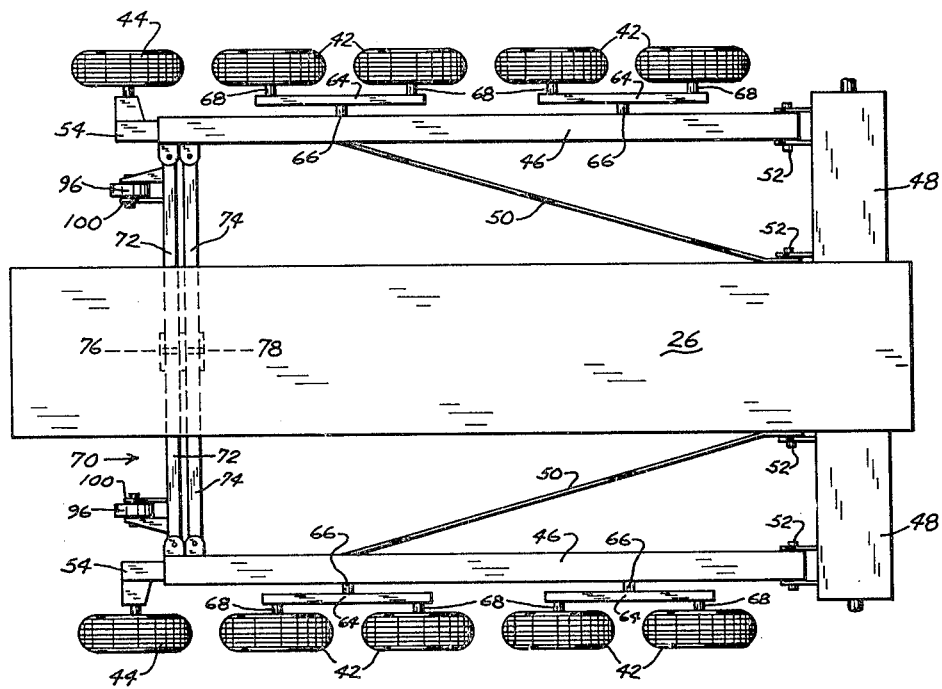
FIG. 4 is a plan view of the main frame, track carriages, equalizer means and walking beam mounting of the bogie wheels.

Reference will be had first to FIGS. 1, 2 and 4 for a general picture of the basic vehicle, which comprises a main body 20 including a forward operator's cab 22, a rear engine hood 24 and a main frame or chassis 26. The main body also includes at each side thereof suitable fenders or catwalks 28. The main body is carried by and between a pair of fore-and-aft track units 30. Disposed within the engine hood and main frame is a drive train of any suitable type, here shown by way of example and not as significant to the invention as an internal combustion engine 32 which drives a hydraulic pumps 34 which in turn powers right and left track unit drive sprockets 38. Suitable reduction gearing may be employed as indicated at 40 (FIG. 3).

Each track unit 30 includes, in addition to the drive sprocket 38, a plurality of rolling elements, here two pairs of bogie wheels 42 and a front idler wheel 44. The wheels are shown as pneumatically tired. The wheels are carried by a fore-and-aft track frame or carriage 46 which is pivoted to the rear of the main frame 26 on a transverse pivot axis via a transverse rear axle housing 48 rigid with the main frame. Each track frame is suitably braced by a diagonal member 50, also pivoted to an axle housing. The pivotal connections are shown at 52 and all are coaxial or common.

The front idler is mounted on a short member 54 telesopically received within the box section (FIG. 5) of the associated track frame and is conventionally backed up by a hydraulic cylinder (not shown) for adjusting tension on an endless track 56 which is trained about the wheels and sprocket. Each track preferably comprises a set of four heavy-duty belts 58 cross-connected at longitudinally spaced intervals by grousers 60 (FIG. 6). The grousers are appropriately staggered to assure that all four belts are interconnected. Interiorly each track includes guides 62 for receiving the tires of the wheels and for engaging the sprockets 38. As an indication of the size of the machine, the tread (center to center) of the tracks is on the order of about ninety-five inches (241.3 cm) and the width of each track is on the order of about sixty inches (152.4 cm). The tires are 4.50×12 8-ply (11.43×30.12 cm). The overall width of the vehicle is one-hundred fifty-five inches (393.7 cm).

A feature of the invention is that each pair of bogie wheels 42 is mounted on a walking beam 64, each of which is pivoted intermediate its ends at 66 to the track frame or carriage and each of which journals at its opposite ends, as at 68, the paired bogie wheels 42. It will be understood that, as to each track unit, the wheels 42 and 46 are co-planar in a vertical, fore-and-aft plane, along with the associated sprocket 38.

From the description thus far, it has been seen that the track units may oscillate or swing in vertical parallel planes relative to each other and relative to the main vehicle body about the transverse rear pivot axis provided at 52—52. It is further seen that the pairs of bogie wheel may oscillate on their respective walking beams in the same vertical plane, thus increasing the adaptability of the tracks 56 to maintain maximum contact with the ground while at the same time minimizing wrack and stress on the main frame. Any extra stresses in the tracks, as endency to stretch, is accommodated by the pneumatic tires on the wheels.

To further augment the versatility of the track units as respects controlled contact with the ground and as respects the ability of the main body to stay level, the track units are interconnected or cross-connected by transverse equalizer means, here in the form of parallel linkage means 70, best seen in FIGS. 5 and 7-11.

Figure 9:
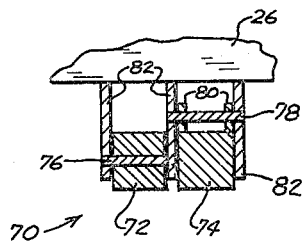
FIG. 9 is an enlarged section showing the pivot mountings of the equalizer beams to the main frame.
Figure 10:
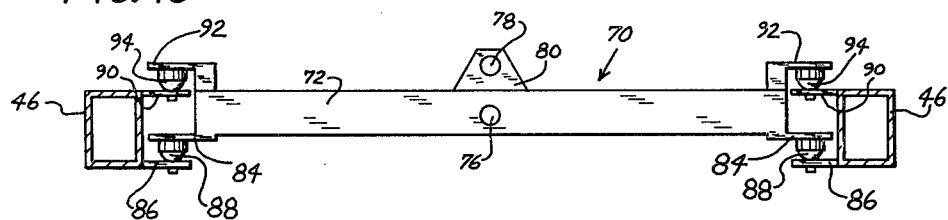
FIG. 10 is a front view, with portions omitted, of the relationship of the equalizer beams to the main body and to the track carriages.

In the preferred form shown here, this means includes front and rear transverse beams or bars 72 and 74 disposed one behind the other in side-by-side relationship. Nerverthless, the beams are connected to the main body 26 at its centerline on vertically spaced apart and alined parallel fore-and-aft axes, one being a lower pivot 76 for the front beam and the other being an upper pivot 78 for the rear beam (FIGS. 9 and 10). Because the beams lie compactly in side-by-side relationship as aforesaid, the rear beam has rigid therewith an upstanding member 80 which projects upwardly and receives the upper pivot. The bottom of the main frame 26 is provided with suitable rigid depending projections 82 to complete the pivotal mounting.

Figure 5:
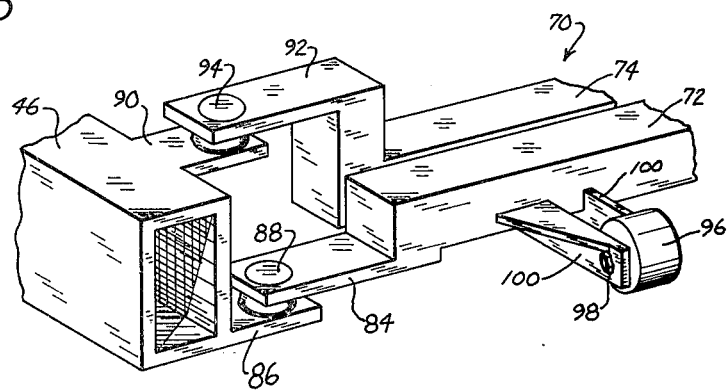
FIG. 5 is an enlarged fragmentary perspective of the connections of one end of the equalizer means to the associated track frame or carriage.
Figure 6:
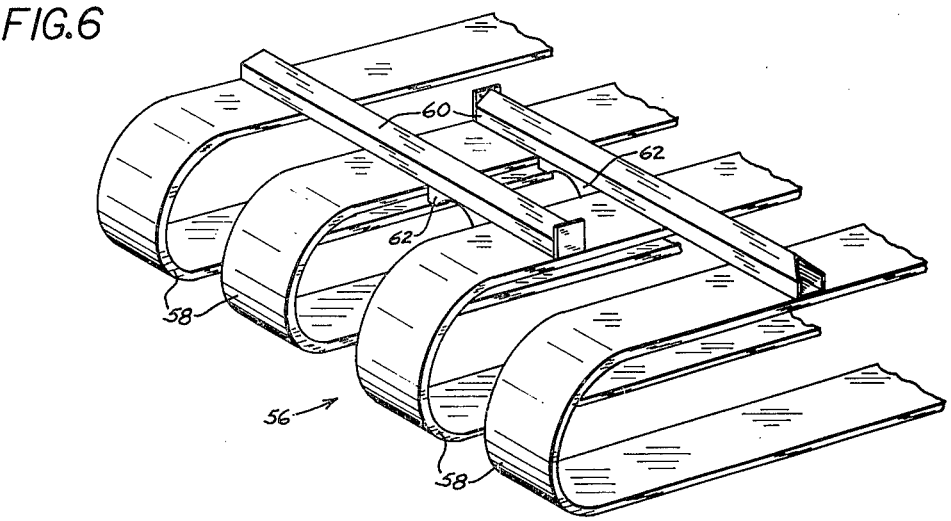
FIG. 6 is an enlarged fragmentary view of the front end of one of the endless tracks.
Figure 8:
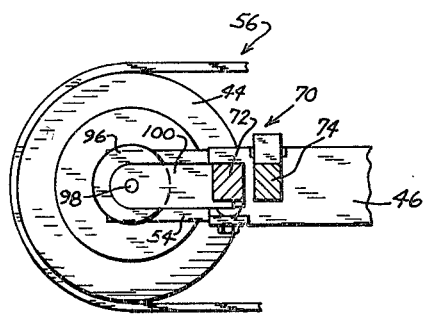
FIG. 8 is a side view, partly in section and with portions omitted, showing the relationship of a guide roller to the associated track.
Figure 7:
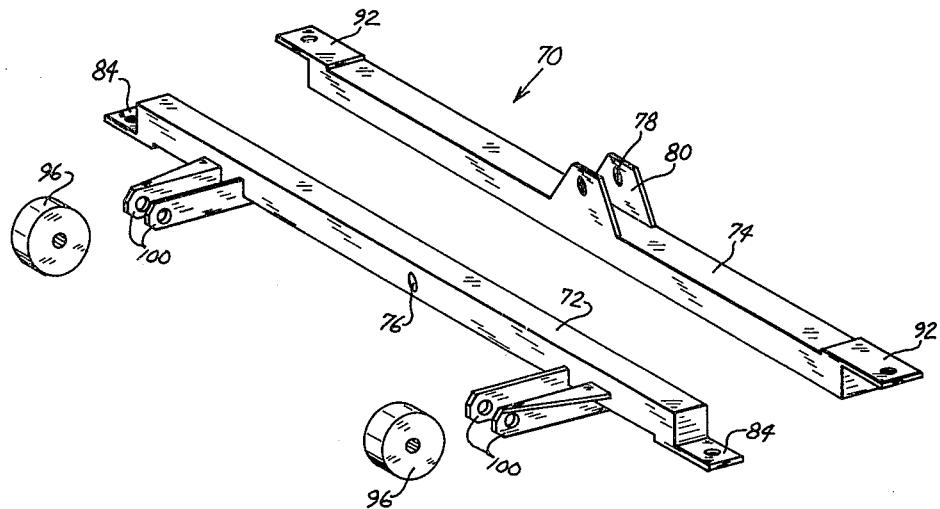
FIG. 7 is an exploded perspective of the equalizer means, guide rollers and one of the track frames.
Figure 11:
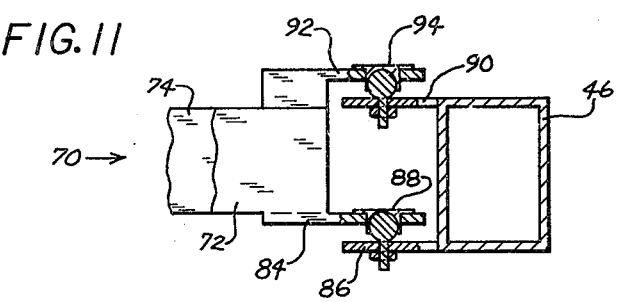
FIG. 11 is an enlarged sectional view (in part) of the ball joints forming the connections of the equalizer beams to a track carriage.

As best seen in FIGS. 5, 7 and 11, the front beam 72 has at each outer end thereof a rigid laterally outwardly projection 84 which mates with or complements a rigid lower inward ear 86 at the front end of the associated track frame 46. The ear and projection are pivotally interconnected as by a ball joint 88 (FIG. 11). Also rigidly carried by the front end of the track frame but offset rearwardly from the lower ear 86 is an inwardly extending ear 90 which mates with or complements a laterally outwardly extending ear projection 92 rigidly affixed to the top outer end of the rear cross beam 74. These two ears are pivotally interconnected as by a ball joint 94 (FIG. 5). Thus, the parallel linkage means 70 is freely articulately interconnected among the main body and track frames to control vertical oscillation of the latter and to keep the vehicle body level during such oscillation. This, in combination with the walking beam mountings of the bogie wheels insures a high degree of flotation, maximum track-to-ground contact and increased stability of the machine, which is especially important when the vehicle is equipped with special grooming equipment such as blades and the like.

Because of the substantial range of oscillation of the track units (16" or 40.64 cm), it is important to prevent such contact between the equalizer bars and tracks as would result in damage. For this purpose, the front beam 72 is equipped at each end with forwardly mounted guide rollers 96 (FIGS. 5, 7 and 8), each of which is journalled on a transverse shaft 98 by means of suitable brackets 100 rigidly affixed to the beam. As will be seen from FIG. 8, these rollers can engage the innersides of the upper and lower runs of the respective tracks during oscillation of the tracks beyond a predetermined range, it being understood that when one roller is engaging the top run of one track, the other roller is engaging the bottom run of the other track.

It should be noted that the vertical spacing between the upper and lower beam pivots 78 and 76 is equal to that between the fore-and-aft axes included in the upper and lower ball joints 94 and 88, which is significant in attaining the basic parallelogram of the parallel linkage means. Because of the length of the equalizer bars relative to the vertical swinging thereof, the slight departure thereof from the plane of travel of each track frame, as the ends of the bars move arcuately, is negligible and not sufficient to interfere mechanically with the oscillation of the track frames. Yet the bars do keep the track frames in vertical planes and avoid camber and toe-in of the bogie and idler wheels, thus keeping the tracks running true and avoiding undue stresses and possible "derailment" of the tracks. This is particularly important in maintaining the vertical planes of swinging of the walking beams and their associated bogie wheels.

Features and advantages of the invention not specifically detailed in the foregoing, as well as modifications in the preferred embodiment chosen for purpose of disclosure, will be apparent to those skilled in the art, all of which may be achieved within the spirit and scope of the invention.

I claim:

1. A track-laying vehicle having a longitudinal main body carried by and between a pair of fore-and-aft track units pivoted at their rear ends to the body on a common transverse pivot axis for vertical oscillation relative to each other and to the body and cross-connected at their front ends to the body by transverse equalizer means, characterized in that the equalizer means comprises parallel linkage means pivoted at opposite ends respectively to the track units on vertically spaced apart pivot axes and pivoted intermediate its ends to the body at its longitudinal centerline on vertically spaced apart pivot axes.

2. The vehicle of claim 1, further characterized in that the pivoting of the parallel linkage means to the track units includes ball joints.

3. The vehicle of claim 1, further characterized in that the parallel linkage means includes a pair of transverse parallel beams pivoted to the body and to the track units as aforesaid.

4. The vehicle of claim 3, further characterized in that the beams lie one behind the other in substantial side-by-side relationship, one beam being pivoted to the body and to the track units on relatively low fore-and-aft axes and the other beam being pivoted to the body and to the track units on relatively higher pivot axes.

5. The vehicle of claim 1, further characterized in that each track unit includes a fore-and-aft carriage frame pivoted at its rear end to the body as aforesaid, a walking beam pivoted intermediate its ends to the carriage frame on a transverse axis, a pair of rolling elements journalled on transverse axes to opposite ends of the walking beam, and an endless track trained about the rolling elements.

6. The vehicle of claim 5, further characterized in that each track unit includes a second walking beam pivoted intermediate its ends to the carriage on a transverse axis spaced longitudinally from the first walking beam pivot and a second pair of rolling elements journaled on transverse axes to opposite ends of the second walking beam, said track being trained also about the second pair of rolling elements.

7. The vehicle of claim 6, further characterized in that the parallel linkage means includes at opposite ends thereof rotatable guide rollers engageable with the innersides of the upper and lower runs of the respective endless tracks during oscillation of the track units beyond a predetermined amount.

8. The vehicle of claim 1, further characterized in that the parallel linkage means includes at opposite ends thereof guide rollers engageable with the innersides of the upper and lower runs of the tracks of the respective track units during oscillation of the track units beyond a predetermined amount.

9. The vehicle of claim 1, further characterized in that the beams lie one behind the other in substantial side-by-side relationship, upper and lower fore-and-aft pivots on the body on its longitudinal centerline, means journalling one beam on the lower pivot, and means journalling the other beam on the upper pivot and including a upright member rigid with said other beam and extending up to said upper pivot.

10. The vehicle of claim 9, further characterized in that the forward one of said beams includes at opposite ends thereof guide rollers for engagement with the innersides of the upper and lower runs of the respective track units during oscillation of said units beyond a predetermined amount.

* * * * *